(12) United States Patent
Meng et al.

(10) Patent No.: US 10,427,980 B2
(45) Date of Patent: Oct. 1, 2019

(54) PREPARATION METHOD OF CERAMIC MEMBRANE SUPPORT

(71) Applicant: SHANDONG GUIYUAN ADVANCED CERAMICS CO., LTD, Zibo, Shandong (CN)

(72) Inventors: Fanpeng Meng, Shandong (CN); Zhenkun Fan, Shandong (CN); Chao Zhang, Shandong (CN); Jian Zhang, Shandong (CN)

(73) Assignee: SHANDONG GUIYUAN ADVANCED CERAMICS CO., LTD, Zibo, Shandong (CN)

( * ) Notice: Subject to any disclaimer, the term of this patent is extended or adjusted under 35 U.S.C. 154(b) by 192 days.

(21) Appl. No.: 15/542,649

(22) PCT Filed: Jul. 22, 2016

(86) PCT No.: PCT/CN2016/091004
§ 371 (c)(1),
(2) Date: Jul. 10, 2017

(87) PCT Pub. No.: WO2017/107477
PCT Pub. Date: Jun. 29, 2017

(65) Prior Publication Data
US 2018/0029941 A1    Feb. 1, 2018

(30) Foreign Application Priority Data

Dec. 25, 2015   (CN) .......................... 2015 1 0997212

(51) Int. Cl.
*C04B 38/00*   (2006.01)
*C04B 35/64*   (2006.01)
(Continued)

(52) U.S. Cl.
CPC ...... *C04B 35/1115* (2013.01); *C04B 35/6262* (2013.01); *C04B 35/62625* (2013.01);
(Continued)

(58) Field of Classification Search
CPC ............. C04B 35/1115; C04B 35/6262; C04B 14/303; C04B 2235/3218; C04B 35/10–35/119
(Continued)

(56) References Cited

U.S. PATENT DOCUMENTS 3,993,572 A * 11/1976 Hindin ..................... B01J 23/10
                                                        252/462
5,779,743 A *  7/1998 Wood ....................... B24D 3/00
                                                        501/153
(Continued)

FOREIGN PATENT DOCUMENTS

| CN | 102910929 | * | 8/2011 | ............. C04B 38/00 |
| CN | 104014252 | * | 5/2014 | ............. B01D 67/00 |
| CN | 104258737 | * | 9/2014 | ............. B01D 67/00 |

OTHER PUBLICATIONS

James M. LeBeau, Comparison study of aqueous binder systems for slurry-based processing (2006), Elsevier, Alll (Year: 2006).*
(Continued)

*Primary Examiner* — Erin Snelting
*Assistant Examiner* — Andrés E. Behrens, Jr.

(57) ABSTRACT

A preparation method of a ceramic membrane support is disclosed. Take aluminum hydroxide, produced through a carbon decomposing process by a sintering method, as a raw material, pre-sinter the aluminum hydroxide, and obtain a low-temperature alumina product A; add a first amount of mineralizer into the product A, grind after calcining the added product A, and obtain a α-alumina product B; mix the product B with $Al_2O_3 \cdot nH_2O$, calcine after adding a second
(Continued)

amount of mineralizer into the mixed product B, and obtain a α-alumina product C; grind, scatter and grade the calcined and heat-preserved α-alumina product C, and obtain polyhedral alumina powders; mix the polyhedral alumina powders, water, humectant and dispersant and then sinter, and finally obtain the porous alumina support. The prepared support is easy to be sintered, is high in alumina purity, is good in corrosion resistance, and is improved in porosity and flux.

5 Claims, 1 Drawing Sheet

(51) Int. Cl.
*C04B 35/10* (2006.01)
*C04B 33/32* (2006.01)
*C04B 35/622* (2006.01)
*C04B 35/101* (2006.01)
*C04B 35/111* (2006.01)
*C04B 35/626* (2006.01)
*C04B 35/636* (2006.01)
*C04B 111/00* (2006.01)

(52) U.S. Cl.
CPC .... *C04B 35/62675* (2013.01); *C04B 35/6365* (2013.01); *C04B 35/64* (2013.01); *C04B 38/00* (2013.01); *C04B 38/0054* (2013.01); *C04B 2111/00801* (2013.01); *C04B 2235/3218* (2013.01); *C04B 2235/3227* (2013.01); *C04B 2235/3229* (2013.01); *C04B 2235/444* (2013.01); *C04B 2235/445* (2013.01); *C04B 2235/5436* (2013.01); *C04B 2235/6021* (2013.01); *C04B 2235/656* (2013.01); *C04B 2235/6567* (2013.01); *C04B 2235/77* (2013.01); *C04B 2235/96* (2013.01)

(58) Field of Classification Search
USPC .............................................. 35/111; 264/629
See application file for complete search history.

(56) References Cited

U.S. PATENT DOCUMENTS

| 5,902,758 | A * | 5/1999 | Hazeyama | C03C 14/004 501/32 |
| 2002/0066982 | A1* | 6/2002 | Yamaguchi et al. | C04B 37/00 264/631 |
| 2004/0247520 | A1* | 12/2004 | Martin | C01F 7/023 423/625 |
| 2018/0244578 | A1* | 8/2018 | Nishio et al. | C04B 35/11 |
| 2019/0062174 | A1* | 2/2019 | Nichol | C01F 7/30 |

OTHER PUBLICATIONS

H. J. H Brouwers, Particle size distribution and packing fraction of geometric random packings (Year: 2006).*
Mostafa Amirjan, Processing and properties of Al-based powder suspension/slurry: A comparison study of aqueous binder systems, stability and film uniformity, 2014, Powder Technology Journal, Elsevier.*
WIPO Machine Translation of CN—102910929, pub. 2011.*
Machine translation of patent CN—104014252 generated on Jul. 25, 2019 from Google Patents https://patents.google.com/patent/CN104014252B/en?oq=CN-104014252 (Year: 2014).*
Machine translation of patent CN—104258737 generated on Jul. 25, 2019 from Google Patents https://patents.google.com/patent/CN104258737B/en?oq=CN-104258737 (Year: 2014).*

* cited by examiner

PREPARATION METHOD OF CERAMIC MEMBRANE SUPPORT

CROSS REFERENCE OF RELATED APPLICATION

This is a U.S. National Stage under 35 U.S.C 371 of the International Application PCT/CN2016/091004, filed Jul. 22, 2016, which claims priority under 35 U.S.C. 119(a-d) to CN 201510997212.6, filed Dec. 25, 2015.

BACKGROUND OF THE PRESENT INVENTION

Field of Invention

The present invention relates to the technical field of preparing the support, and more particularly to a preparation method of a ceramic membrane support.

Description of Related Arts

The inorganic ceramic membrane is widely used in petrochemical, food and medicine industries due to excellent high temperature resistance, good chemical stability, high filtration precision, chemical corrosion resistance and high mechanical strength. The ceramic support is the basis for the preparation and use of the entire ceramic membrane. Whether the performance of the ceramic support is good or bad plays a vital role in the quality of the late membrane and the overall application performance.

Due to excellent chemical stability and mechanical property, $\alpha$-$Al_2O_3$ becomes the most commonly used raw material for preparing the porous ceramic membrane support. For the 99-porous alumina ceramic support commonly used in the market, according to the theory of particle stacking, the membrane support with the average pore size of 5-10 μm should be obtained. In order to ensure the high permeability of the support, the particle size of the alumina particles should be in the range of 20-30 μm. At present, foreign commercial ceramic membrane supports are mainly prepared by using ellipsoidal powders with an average particle size of about 30 μm, in which U.S. Pat. No. 4,250,058 discloses a method of dispersing an acidic aluminum sol containing the ammonia precursor in hot oil to prepare spherical alumina particles with good mechanical strength, and U.S. Pat. No. 4,514,511 also describes a similar process for preparing spherical alumina powders. Although the above-mentioned schemes can prepare the high-strength and nearly-spherical alumina powders, there are some problems such as high cost and complex operation. In addition, the sintering temperature above 1750° C. is needed in the later preparation of the support. At present, the domestic sintering equipment cannot perform the sintering process at the above high temperature. Due to the domestic preparation process of the alumina powders is insufficient, rod-shaped corundum or alumina powders are mostly adopted to prepare the ceramic membrane support. The patent about spherical powders such as CN 1278458A discloses a preparation method of spherical alumina powders through the spray granulation process, in which Ding Xiangjin and so on utilize this spherical alumina powders with D50=22.4 μm to make a series of experiments; when the anti-explosion strength is larger than 3 M, the product porosity is only 290%. The patent CN 101337808A discloses a method of preparing nearly-spherical alumina powders, which comprises steps of selecting alumina as a raw material, adding a mineralizer into the alumina, and then calcining at high temperature, and then ball-grinding, washing with water and grading. In spite that the above patents can prepare the spherical alumina powders, there are some problems during the preparation of the support such as the particles are too round to sinter and prepare the spherical alumina powders with large porosity (<20 μm), the operation is complex, the process is difficult to be controlled, and the cost is high, which directly leads to instable performance, short service life, and complex manufacturing process and cost of the ceramic membrane support, thus limiting the industrial applications.

SUMMARY OF THE PRESENT INVENTION

An object of the present invention is to provide a preparation method of a ceramic membrane support, which is scientific, reasonable, simple and easy. The prepared ceramic membrane support is easy to be sintered, is high in porosity, flux, strength and alumina purity, and good in corrosion resistance.

A preparation method of a ceramic membrane support, provided by the present invention, comprises steps of:

(1) taking aluminium hydroxide, produced through a carbon decomposing process by a sintering method, as a raw material, pre-sintering the aluminium hydroxide, and obtaining a low-temperature alumina product A;

(2) adding a first amount of mineralizer into the product A, grinding after calcining the added product A till a particle size is in a range of 5-15 μm, and obtaining a $\alpha$-alumina product B;

(3) mixing the product B with $Al_2O_3 \cdot nH_2O$, wherein n=1-3, calcining after adding a second amount of mineralizer into the mixed product B, obtaining a $\alpha$-alumina product C and heat-preserving the $\alpha$-alumina product C;

(4) grinding, scattering and grading the calcined and heat-preserved $\alpha$-alumina product C, and obtaining polyhedral alumina powders; and (5) selecting a part of the polyhedral alumina powders, which comprises a subpart of the polyhedral alumina powders whose D50 is in a range of 20-25 μm and amount is 75-85% of a total mass of the polyhedral alumina powders, and a subpart of polyhedral alumina powders whose D50 is in a range of 3-5 μm and amount is 15-25% of the total mass of the polyhedral alumina powders, as aggregates, obtaining muds after mixing and evenly stirring the aggregates with a binder, water, humectant and dispersant, aging the muds under sealed conditions, extruding the aged muds and obtaining a green body by an extruder, heat-preserving after drying the green body, and then sintering, and finally obtaining a porous alumina support.

In the step (1), a pre-sintering temperature is in a range of 300-500° C., and a pre-sintering time is in a range of 1-10 h.

In the step (2), the mineralizer is one or more members selected from a group consisting of aluminum chloride, aluminum nitrate, boric acid, sodium borate, aluminum fluoride, ammonium fluoride, calcium fluoride, magnesium fluoride, magnesium carbonate, magnesium chloride, sodium chloride, ammonium chloride, cerium fluoride, cerium oxide and lanthanum oxide, and an added amount of the mineralizer is 0.1-2 wt % of the product A.

In the step (2), a calcining temperature is in a range of 1400-1700° C., and a calcining time is in a range of 8-20 h.

In the step (3), a mass ratio of the product B to $Al_2O_3 \cdot nH_2O$ is in a range of 1-10:1, and $Al_2O_3 \cdot nH_2O$ is one or more members selected from a group consisting of pseudoboehmite, boehmite and aluminum hydroxide.

In the step (3), the mineralizer is one or more members selected from a group consisting of aluminum chloride, aluminum nitrate, boric acid, sodium borate, aluminum fluoride, ammonium fluoride, calcium fluoride, magnesium fluoride, magnesium carbonate, magnesium chloride, sodium chloride, ammonium chloride, cerium fluoride, cerium oxide and lanthanum oxide, and an added amount of the mineralizer is 0.1-2 wt % of a total mass of the product B and $Al_2O_3 \cdot nH_2O$.

In the step (3), a calcining temperature is in a range of 1300-1400° C., and a calcining time is in a range of 3-10 h.

In the step (4), a primary particle size D50 of the polyhedral alumina powders is in a range of 1-30 μm.

In the step (5), the binder is methylcellulose or hydroxypropyl methyl cellulose with an added amount of 4-10% of the total mass of the polyhedral alumina powders; an added amount of the water is 20-40% of the total mass of the polyhedral alumina powders; the humectant is glycerin with an added amount of 1.5-3.5% of the total mass of the polyhedral alumina powders; the dispersant is polyethylene glycol or PVA dispersant with an added amount of 2-5% of the total mass of the polyhedral alumina powders.

In the step (5), an aging time is 24-36 h, a heat preservation temperature is in a range of 1650-1680° C., and a heat preservation time is in a range of 3-6 h.

The present invention is able to pre-prepare the polyhedral alumina powders with polyhedral shape, large crystals, high specific gravity and adjustable particle size. According to a certain proportion, the polyhedral alumina powders selected as the aggregates, are able to prepare the support with an average pore diameter in a range of 1-10 μm and a porosity in a range of 33-40%.

The present invention utilizes the aluminum hydroxide prepared by the sintering method as the raw material, and then produces the alumina powders for preparing the support through three sintering processes, wherein the alumina powders have large crystals (with a primary particle size D50 is larger than 20 μm), elliptical polyhedron structure, and high purity, and are able to be used as the raw material for the ceramic membrane support. The polyhedral alumina, provided by the present invention, looks rounded to enlarge the contact area between particles, so that only the use of polyhedral alumina itself is able to be sintered to obtain the high-strength porous alumina ceramic membrane support, thus overcoming the problems that the spherical alumina is too round to be sintered, is not high in porosity and has the primary particle size D50 smaller than 20 μm. Therefore, the prepared support is easy to be sintered, high in alumina purity, good in corrosion resistance, and improved in porosity and flux.

Also, the preparation method of the ceramic membrane support, provided by the present invention, specifically comprises steps of:

(1) taking aluminium hydroxide, produced through a carbon decomposing process by a sintering method, as a raw material, pre-sintering the aluminium hydroxide at 300-500° C. for 1-10 h, and obtaining a low-temperature alumina product A;

(2) adding a first amount of mineralizer into the product A, grinding after calcining the added product A at 1400-1700° C. for 8-20 h in shuttle kiln or tunnel kiln till a particle size is in a range of 5-15 μm, and obtaining a α-alumina product B;

(3) mixing the product B with $Al_2O_3 \cdot nH_2O$, wherein n=1-3, calcining after adding a second amount of mineralizer into the mixed product B at 1300-1400° C. for 3-10 h in the shuttle kiln or tunnel kiln, obtaining a α-alumina product C and heat-preserving the α-alumina product C;

(4) grinding, scattering and grading the calcined and heat-preserved α-alumina product C, and obtaining polyhedral alumina powders; and (5) selecting a part of the polyhedral alumina powders, which comprises a subpart of the polyhedral alumina powders whose D50 is in a range of 20-25 μm and amount is 75-85% of a total mass of the polyhedral alumina powders, and a subpart of polyhedral alumina powders whose D50 is in a range of 3-5 μm and amount is 15-25% of the total mass of the polyhedral alumina powders, as aggregates, obtaining muds after mixing and evenly stirring the aggregates with a binder, water, humectant and dispersant, aging the muds for 24-36 h under sealed conditions, extruding the aged muds and obtaining a round tubular or platy green body through a mold by an extruder, drying the green body, heat-preserving the dried green body at 1650-1680° C. for 3-6 h after temperature rise, and then sintering, and finally obtaining a porous alumina support.

Compared with the prior art, the present invention has beneficial effects as follows.

(1) The present invention is able to prepare a series of polyhedral alumina powders for the ceramic support with D50=1-30 μm, and especially to prepare the powders with the primary particle size D50>20 μm, which is beneficial to prepare the alumina ceramic support with a large pore size of 5-10 μm and a porosity of 35-40%.

(2) The polyhedral alumina in the present invention is not regularly round to enlarge the contact area between particles, so that only the polyhedral alumina itself is able to be sintered to obtain the high-strength porous alumina ceramic membrane support. Through the polyhedral alumina powders with D50=20 μm and D50=3 μm, the four-channel support with a porosity of 37%, an outer diameter of 30 mm and a three-point flexural strength of 4300 N is able to be obtained at 1650° C., thus avoiding complicated preparation steps such as raising temperature, adding sintering additives and coating the powders for ensuring the sintering strength of the product, to simplify the process flow and reduce the cost.

DETAILED DESCRIPTION OF THE PREFERRED EMBODIMENT

Figure 1:
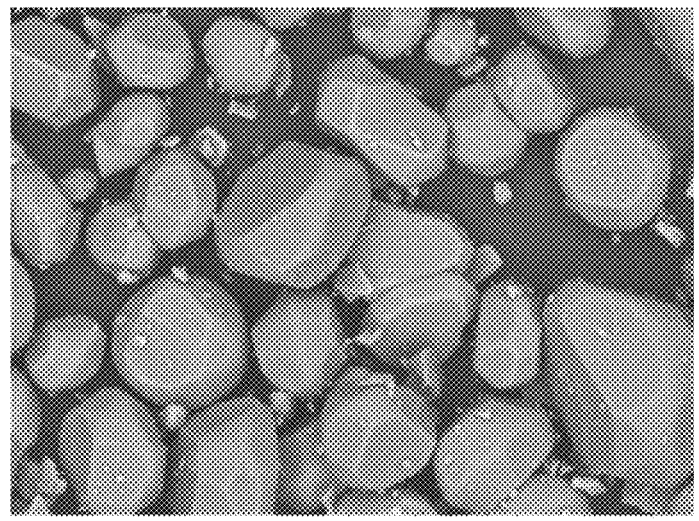
FIG. 1 is an electron microscopic image of polyhedral alumina powders according to a first preferred embodiment of the present invention.
Figure 2:
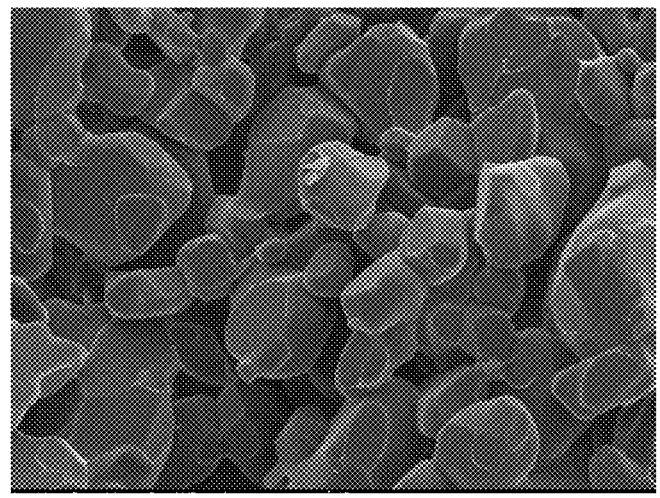
FIG. 2 is an electron microscopic image of porous ceramic support according to the above first preferred embodiment of the present invention.

The present invention is further explained with accompanying embodiments.

Embodiment 1

Aluminium hydroxide produced by a sintering method is selected as a raw material, and then is sintered at 350° C. for 2 h, and then a low-temperature alumina product A is obtained; and then ammonium fluoride mineralizer with an amount of 0.5 wt % is added, and then is calcined at 1550° C. in shuttle kiln, and then is heat-preserved for 15 h, and then is ground for 120 minutes through a ball grinder, and calcined alumina micro powders B with a particle size of 10 μm are obtained; and then is mixed with boehmite with a mass ratio of 5:1, and then boric acid mineralizer with an amount of 0.3 wt % is added, and then is calcined at 1350° C. in the shuttle kiln, and then is heat-preserved for 5 h, and then is ground for 120 minutes through the ball grinder, and then is graded, and finally polyhedral alumina powders with a particle size of 20 μm and 3 μm are obtained.

The polyhedral alumina powders with D50=20 μm and D50=3 μm, whose masses are respectively 85% and 15% of a total mass of the polyhedral alumina powders, are selected; and then polyethylene glycol 600 with a mass of 2% of the total mass of the polyhedral alumina powders, as a dispersant, is added; and then is put into a vessel, and then is ball-ground and dispersed for 1 h, and then methylcellulose with a mass of 5% of the total mass of the polyhedral alumina powders is added to evenly mix, and then water with a mass of 25% of the total mass of the polyhedral alumina powders and glycerin with a mass of 1% of the total mass of the polyhedral alumina powders are added and stirred, and then muds are obtained, and then are extruded under vacuum conditions, and then single-channel and four-channel alumina support green bodies are obtained, and then is dried, and then is sintered to 1650° C., and then is heat-preserved for 4 h, and finally a polyhedral alumina ceramic membrane support is obtained. Through testing, it is found that a porosity of the support is 39% and a pore size thereof is 2 μm; the four-channel support, with an outer diameter of 30 mm, has a three-point flexural strength of 4500 N; after being immersed in 40% concentrated sulfuric acid at 100° C. for 24 h, and 20% sodium hydroxide solution at 100° C. for 24 h, the support is less than 1% in the strength loss rate and is less than 0.01% in the mass loss rate.

Embodiment 2

Aluminium hydroxide produced by a sintering method is selected as a raw material, and then is sintered at 500° C. for 1 h, and then a low-temperature alumina product A is obtained; and then a composite mineralizer of aluminum fluoride and aluminum chloride with a total amount of 0.6 wt % is added, and then is calcined at 1500° C. in shuttle kiln, and then is heat-preserved for 10 h, and then is ground for 90 minutes through a ball grinder, and calcined alumina micro powders B with a particle size of 15 μm are obtained; and then is mixed with aluminum hydroxide with a mass ratio of 6:1, and then boric acid mineralizer with an amount of 0.3 wt % is added, and then is calcined at 1400° C. in the shuttle kiln, and then is heat-preserved for 10 h, and then is ground for 120 minutes through the ball grinder, and then is graded, and finally polyhedral alumina powders with a particle size of 25 μm and 5 μm are obtained.

The polyhedral alumina powders with D50=25 μm and D50=5 μm, whose masses are respectively 75% and 25% of a total mass of the polyhedral alumina powders, are selected; and then polyethylene glycol 600 with a mass of 4% of the total mass of the polyhedral alumina powders, as a dispersant, is added; and then is put into a vessel, and then is ball-ground and dispersed for 1 h, and then methylcellulose with a mass of 8% of the total mass of the polyhedral alumina powders is added to evenly mix, and then water with a mass of 30% of the total mass of the polyhedral alumina powders and glycerin with a mass of 1% of the total mass of the polyhedral alumina powders are added and stirred, and then muds are obtained, and then are extruded under vacuum conditions, and then single-channel and four-channel alumina support green bodies are obtained, and then is dried, and then is sintered to 1680° C., and then is heat-preserved for 6 h, and finally a polyhedral alumina ceramic membrane support is obtained. Through testing, it is found that a porosity of the support is 34% and a pore size thereof is 8 μm; the four-channel support, with an outer diameter of 30 mm, has a three-point flexural strength of 4200 N; after being immersed in 40% concentrated sulfuric acid at 100° C. for 24 h, and 20% sodium hydroxide solution at 100° C. for 24 h, the support is less than 1.5% in the strength loss rate and is less than 0.01% in the mass loss rate.

Embodiment 3

Aluminium hydroxide produced by a sintering method is selected as a raw material, and then is sintered at 400° C. for 8 h, and then a low-temperature alumina product A is obtained; and then a composite mineralizer of aluminum fluoride, magnesium fluoride and aluminum nitrate with a total amount of 1 wt % is added, and then is calcined at 1450° C. in shuttle kiln, and then is heat-preserved for 15 h, and then is ground for 120 minutes through a ball grinder, and calcined alumina micro powders B with a particle size of 12 μm are obtained; and then is mixed with aluminum hydroxide with a mass ratio of 3:1, and then boric acid mineralizer with an amount of 0.5 wt % is added, and then is calcined at 1600° C. in the shuttle kiln, and then is heat-preserved for 8 h, and then is ground for 120 minutes through the ball grinder, and then is graded, and finally polyhedral alumina powders with a particle size of 22 μm and 5 μm are obtained.

The polyhedral alumina powders with D50=22 μm and D50=5 μm, whose masses are respectively 80% and 20% of a total mass of the polyhedral alumina powders, are selected; and then polyethylene glycol 600 with a mass of 5% of the total mass of the polyhedral alumina powders, as a dispersant, is added; and then is put into a vessel, and then is ball-ground and dispersed for 1 h, and then hydroxypropyl methyl cellulose with a mass of 6% of the total mass of the polyhedral alumina powders is added to evenly mix, and then water with a mass of 28% of the total mass of the polyhedral alumina powders and glycerin with a mass of 2% of the total mass of the polyhedral alumina powders are added and stirred, and then muds are obtained, and then are extruded under vacuum conditions, and then single-channel and four-channel alumina support green bodies are obtained, and then is dried, and then is sintered to 1680° C., and then is heat-preserved for 5 h, and finally a polyhedral alumina ceramic membrane support is obtained. Through testing, it is found that a porosity of the support is 37% and a pore size thereof is 2 μm; the four-channel support, with an outer diameter of 30 mm, has a three-point flexural strength of 4400 N; after being immersed in 40% concentrated sulfuric acid at 100° C. for 24 h, and 20% sodium hydroxide solution at 100° C. for 24 h, the support is less than 1.2% in the strength loss rate and is less than 0.01% in the mass loss rate.

The foregoing is intended only as preferred embodiments of the present invention. Therefore, it is not intended to limit the scope of the present invention, that is, the equivalent variations and modifications in accordance with the scope and the specification of the present invention are intended to be within the scope of the present invention.

What is claimed is:
1. A preparation method of a ceramic membrane support, comprising steps of:

(1) taking aluminium hydroxide, produced through a carbon decomposing process, as a raw material, pre-sintering the aluminium hydroxide, and obtaining an alumina product A;

(2) calcining after adding a first mineralizer into the alumina product A, and then grinding till a particle size is in a range of 5-15 μm, and then obtaining a α-alumina product B, wherein: the first mineralizer is one or more members selected from a group consisting of aluminum chloride, aluminum nitrate, boric acid, sodium borate, aluminum fluoride, ammonium fluoride, calcium fluoride, magnesium fluoride, magnesium carbonate, magnesium chloride, sodium chloride, ammonium chloride, cerium fluoride, cerium oxide and lanthanum oxide, and an added amount of the first mineralizer is 0.1-2 wt % of the alumina product A;

(3) mixing the product B with $Al_2O_3 \cdot nH_2O$, wherein n=1-3, calcining after adding a second mineralizer into the mixed product B, obtaining a α-alumina product C and heat-preserving the α-alumina product C, wherein: a mass ratio of the product B to the $Al_2O_3 \cdot nH_2O$ is in a range of (1-10):1, and the $Al_2O_3 \cdot nH_2O$ is one or more members selected from a group consisting of pseudo-boehmite, boehmite and aluminum hydroxide;

the second mineralizer is one or more members selected from a group consisting of aluminum chloride, aluminum nitrate, boric acid, sodium borate, aluminum fluoride, ammonium fluoride, calcium fluoride, magnesium fluoride, magnesium carbonate, magnesium chloride, sodium chloride, ammonium chloride, cerium fluoride, cerium oxide and lanthanum oxide, and an added amount of the second mineralizer is 0.1-2 wt % of a total mass of the product B and the $Al_2O_3 \cdot nH_2O$;

(4) grinding, scattering and grading the calcined and heat-preserved α-alumina product C, and obtaining polyhedral alumina powders, wherein: a primary particle size D50 of the polyhedral alumina powders is in a range of 1-30 μm; and (5) selecting a part of the polyhedral alumina powders as aggregates, wherein the part of the polyhedral alumina powders comprises a first subpart of the polyhedral alumina powders whose D50 is in a range of 20-25 μm and amount is 75-85% of a total mass of the polyhedral alumina powders, and a second subpart of the polyhedral alumina powders whose D50 is in a range of 3-5 μm and amount is 15-25% of the total mass of the polyhedral alumina powders, obtaining muds after mixing and evenly stirring the aggregates with a binder, water, humectant and dispersant, aging the muds under vacuum sealed, extruding the aged muds and obtaining a green body by an extruder, heat-preserving after drying the green body, and then sintering, and finally obtaining a porous alumina support, wherein:

the binder is methylcellulose or hydroxypropyl methyl cellulose with an added amount of 4-10% of the total mass of the polyhedral alumina powders; an added amount of the water is 20-40% of the total mass of the polyhedral alumina powders; the humectant is glycerin with an added amount of 1.5-3.5% of the total mass of the polyhedral alumina powders; the dispersant is polyethylene glycol or PVA dispersant with an added amount of 2-5% of the total mass of the polyhedral alumina powders.

2. The preparation method of the ceramic membrane support, as recited in claim 1, wherein: in the step (1), a sintering temperature is in a range of 300-500° C., and a sintering time is in a range of 1-10 h.

3. The preparation method of the ceramic membrane support, as recited in claim 2, wherein: in the step (2), a calcining temperature is in a range of 1400-1700° C., and a calcining time is in a range of 8-20 h.

4. The preparation method of the ceramic membrane support, as recited in claim 3, wherein: in the step (3), a calcining temperature is in a range of 1300-1400° C., and a calcining time is in a range of 3-10 h.

5. The preparation method of the ceramic membrane support, as recited in claim 4, wherein: in the step (5), an aging time is 24-36 h, a heat preservation temperature is in a range of 1650-1680° C., and a heat preservation time is in a range of 3-6 h.

* * * * *